United States Patent [19]
Kamei et al.

[11] Patent Number: 5,019,252
[45] Date of Patent: May 28, 1991

[54] PORTABLE WATER PURIFIER

[75] Inventors: Eiichi Kamei; Yasushi Shimomura, both of Hirakata; Yasuo Kanda; Tadashi Ogawa, both of Tokyo, all of Japan

[73] Assignees: Ube Industries, Ltd., Yamaguchi; Iwatani & Co., Ltd., Oosaka; LEC, Inc., Tokyo, all of Japan

[21] Appl. No.: 476,133

[22] Filed: Feb. 6, 1990

Related U.S. Application Data

[63] Continuation of Ser. No. 315,207, Feb. 22, 1989, abandoned, which is a continuation of Ser. No. 175,582, Mar. 28, 1988, abandoned, which is a continuation of Ser. No. 16,872, Feb. 20, 1987, abandoned.

[30] Foreign Application Priority Data

Feb. 20, 1986 [JP] Japan ............................ 61-22147[U]

[51] Int. Cl.⁵ .............................................. C02F 9/00
[52] U.S. Cl. .................................. 210/136; 210/258; 210/266; 210/282; 210/416.3
[58] Field of Search ............ 210/136, 266, 282, 416.3, 210/258

[56] References Cited

U.S. PATENT DOCUMENTS 2,670,081  2/1954  Quinn ................................. 210/266
4,636,307  1/1987  Inoue et al. ........................ 210/266

Primary Examiner—Ivars Cintins
Attorney, Agent, or Firm—Frishauf, Holtz, Goodman & Woodward

[57] ABSTRACT

A portable water-purifying means comprising an oblong pump room containing a hand pump therein and an oblong water-purifying room containing a water-purifying means therein and being equipped on its upper side with a water outlet in a casing equipped with a water inlet. The pump room and the water-purifying room are arranged in parallel to each other with a partition separating the two rooms, and these rooms communicate with each other through a passage arranged on their bottom sides. The water inlet and the passage are provided respectively with check valves which operates to limit flow of water to the direction from the inlet to the water-purifying room.

3 Claims, 2 Drawing Sheets

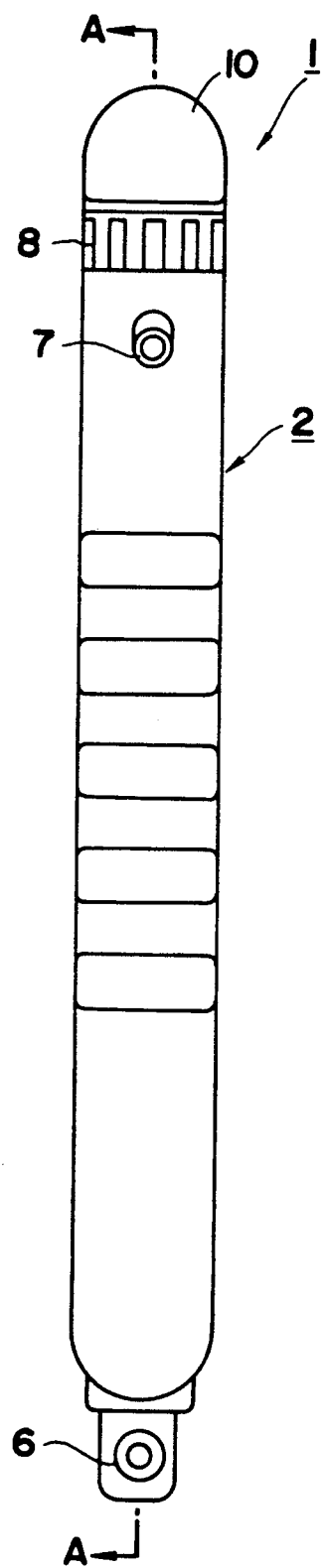
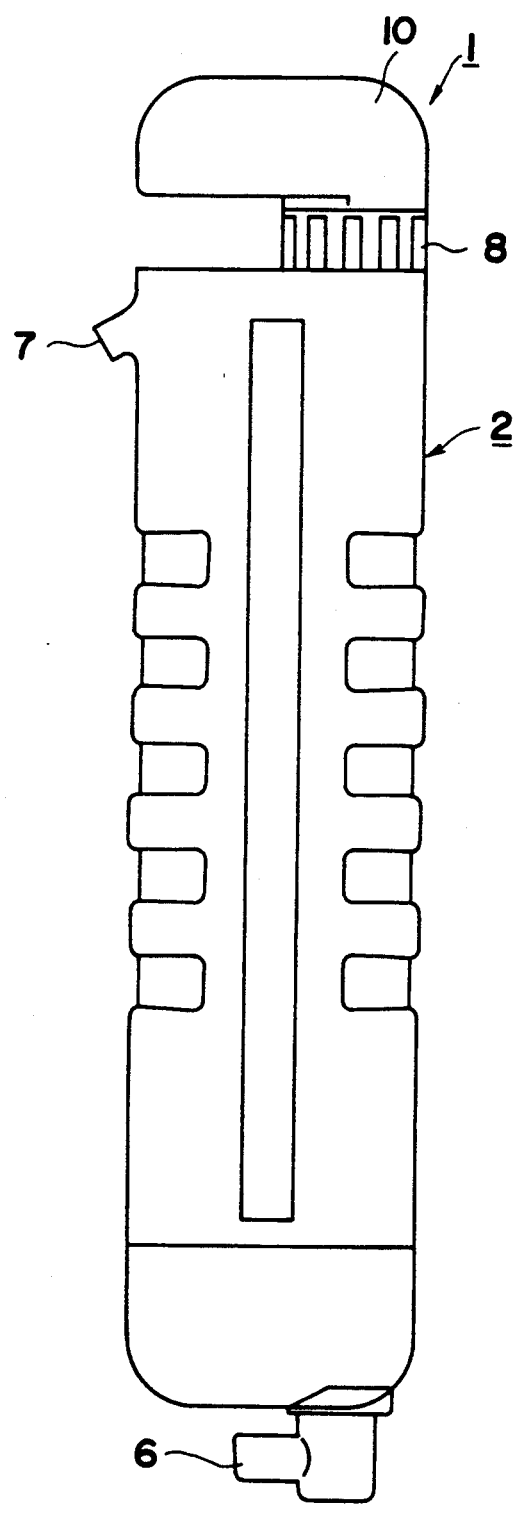

PORTABLE WATER PURIFIER

This application is a continuation, of application Ser. No. 07/315,207, filed Feb. 22, 1989, which in turn is a continuation of Ser. No. 07/175,582 filed Mar. 28, 1988which in turn is a continuation of Ser. No. 07/016,872, filed Feb. 20, 1987, all now abandoned.

BACKGROUND OF THE INVENTION

1. Field of the Invention

The present invention relates to a portable water purifier.

2. Description of prior art

For purifying polluted water such as river water, lake water, and other water which is not suitable for drinking or cooking to obtain clear water for the use for drinking, cooking and the like, the water is generally supplied to a small-size tank containing active carbon or small stones for purification, and the purified water is then recovered from the outlet arranged on the bottom of the tank. Although such a conventional purifying device is of relatively small size, it is still too large for people to carry with them to outdoors where no water service is available.

SUMMARY OF THE INVENTION

It is an object of the present invention to provide a portable water-purification means which has a small size enough for people to carry with them to outsides such as sea and mountain.

There is provided by the present invention a portable water purifier comprising an oblong pump room containing a hand pump therein and an oblong water-purifying room containing a water-purifying means therein and being equipped on its upper side with a water outlet in a casing equipped with a water inlet, the pump room and the water-purifying room being arranged in parallel to each other with a partition separating the two rooms but communicating these room to each other through a passage arranged on their bottom sides, the water inlet and the passage being provided respectively with check valves which operates to limit flow of water to the direction from the water inlet to the water-purifying room.

In the use of the water purifier of the invention, the water inlet of the purifier, or a hose or a pipe optionally attached to the water inlet is introduced into water to be purified, such as polluted water, and then the pump is operated to move reciprocally, whereby the two check valves arranged respectively in the water inlet and the passage communicating the pump room and the water-purifying room operate alternately to draw the polluted water into the pump room and subsequently the introduced water is forced to flow upwardly through the water-purifying means, and the purified water is then taken out from the water outlet.

BRIEF DESCRIPTION OF THE DRAWINGS

FIG. 1 to FIGS. 3-(a), -(b), -(c) & -(d) together show an example of the portable water purifier according to the present invention.

FIG. 1 is a front view of the water purifier, and FIG. 2 is a side view of the water purifier. FIG. 3-(a) is a sectional view of the water purifier of FIG. 1 taken along A—A line, FIG. 3-(b) is a sectional view of the water purifier of FIG. 1 taken along B—B line seen FIG. 3-(a), FIG. 3-(c) is a sectional view of the water purifier of FIG. 1 taken along C—C line seen in FIG. 3-(a), and FIG. 3-(d) is a sectional view of the water purifier of FIG. 1 taken along D—D line seen in FIG. 3-(a).

DETAILED DESCRIPTION OF THE INVENTION

Figure 3:
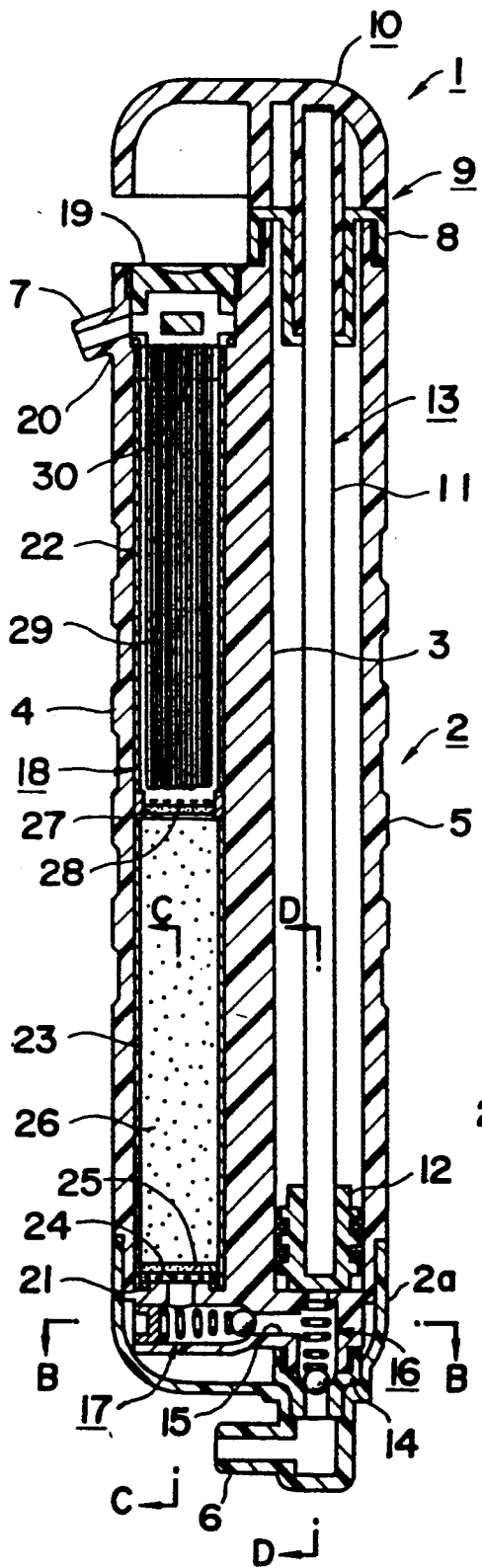
Figure 3:
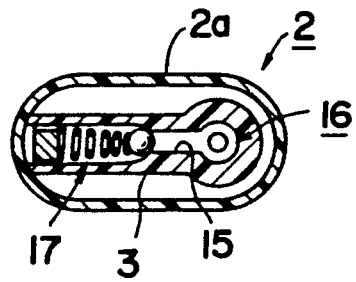
Figure 3:
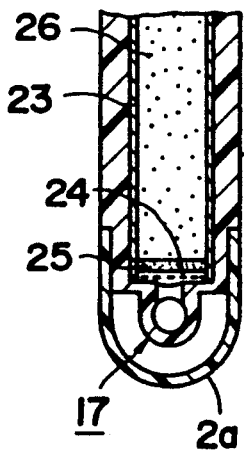
Figure 3:
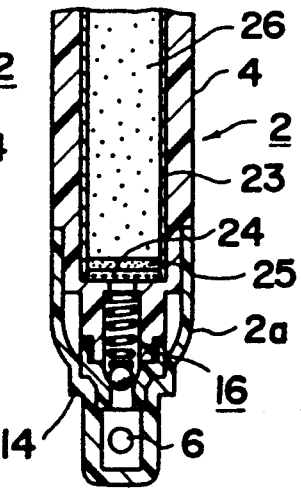

The portable water purifier according to the present invention is described below in more detailed referring to the attached drawings wherein a preferred embodiment of the portable water purifier according to the present invention is illustrated.

The water purifier of the invention can be composed mainly of plastic materials except for the same means and device otherwise indicated in the following description.

In the drawings, a portable water purifier 1 comprises an oblong casing 2 having an oval section, wherein an oblong water-purifying room 4 having a circular lateral section and an oblong pump room 5 having a circular lateral section are arranged in parallel with a partition 3 having a vertical section in the form of up-side-down T figure which separates the two rooms from each other, but communicates these rooms to each other through a passage arranged on their bottom sides.

The bottom portion of the casing 2 comprises a bottom cap 2a equipped with a water inlet 6. At the top of the water-purifying room 4 is arranged a water outlet 7. On the top of the pump room 5 is arranged a cap 8 with a screw. The cap 8 is provided rotatably and slidably with a handle 10 of a manually operatable pump 9. The pump comprises the handle 10 and a piston 13 composed of a metal rod 11 and a head 12 fixed to the rod 11 at the bottom portion. The piston 13 is operated to move up and down by the handle 10 to introduce water into the pump room 5 through the water inlet 6 and to compress the introduced water to supply it into the purifying room 4. The handle 10 is generally placed at the place illustrated in Figures, but rotated at an angle of approx. 180° when the handle 10 is operated. At the bottom of the partition 3 is screwed a metallic valve 14 having a valve seat communicating the water inlet 6. The valve 14 is fitted to the bottom cap 2a. The valve 14, the pump room 5 and the purifying room 4 communicate with each other via a passage 15 provided therein with another valve. The numerals 16, 17 indicates a pair of check valves each of which comprises a ball and a compressing coil spring to open and close a pair of the valve seats arranged in the passage 15 in series. Each of the pair of the valve seats is opened and closed alternately to each other by the up-and-down movement of the piston 13 of the pump 9. In more detail, the water inlet 6 or a hose or a pipe optionally attached to the water inlet 6 is placed in a water; the piston 11 is drawn upwardly to open the check valve 16 and simulataneously to close the check valve 17, whereby water is drawn into the pump room 5; and then the piston 11 is pushed downwardly to close the check valve 16 and simulataneously to open the check valve 17, whereby the water is supplied into the purifying room 4 from the pump room 5 via the passage 15. In the purifying room 4, a cartridge 18 (water-purifying means) containing a water-purifying material is placed.

To the top of the water-purifying room 4 is detachably screwed a cap 19 having a water passage in the form of a circular groove which communicates the purifying room 4 to the water outlet 7. The cartridge 18 is encased under sealing with o-rings 20, 21 in the purifying room 4 having the cap 19. The cartridge 18 is in the form of cylinder, and the cylindrical cartridge 18 comprises an upper cylinder 22 and a lower cylinder 23 which are combined at the center of the cartridge 18. The cartridge 18 can be detached from the purifier for exchange by removing the cap 19. The lower cylinder 23 is capped at the lower opening end with a composite of a mesh plate 24 of stainless steel or the like and a non-woven cloth 25 of polyolefin fibers or the like. The lower cylinder 23 having the capped lower opening is filled with active carbon 26 capable of purifying the introduced water through adsorption. The upper cylinder 22 is capped at the lower opening end with a composite of a nonwoven cloth 27 of polyolefin fibers or the like and a mesh plate 28 of a stainless steel. In the upper cylinder 22 are arranged a separating membrane module comprising a great number of porous hollow fiber (or yarn) 29 under such condition that the porous hollow fiber is bent in the U shape to have open ends at the top. The top portions of the hollow fibers are supported by a potting member 30 of polyurethane resin or the like.

The porous hollow fibers 29 are prepared by spinning out a polyolefin resin to form hollow fibrous materials (for example, outer diameter: approx. 400 μm, inner diameter: approx. 300 μm), thermally processing the fibrous materials, drawing continuously the materials at a high temperature and at low speed, binding altogether and cutting the bound fibrous materials. Thus prepared hollow fiber is a porous one having a great number of openings (or pores) on the wall portion. The porous hollow fiber of polyolefin resin may be processed on the inner surface and the outer surface with a hydrophlic material such as ethylene oxide to make these surfaces hydrophilic.

The water supplied under pressure given by the pump 9 is introduced into the upper cylinder 22, and elevates along the outer surfaces of the walls of the hollow fibers 29, during which the water enters into the inner space of the hollow fiber 29 through the openings of its wall, separating microorganisms, dust and other polluting materials outside of the fiber wall. Thus purified water is taken out from the water outlet 7 via the water passage of the cap 19.

In the above, the purifying means comprising a combination of active carbon and porous hollow fibers is described. However, it should be understood that the purifying means is not limited to these materials. For instance, the purifying means may comprise adsorbent material such as active carbon only or separating membrane such as porous separating film or porous hollow fiber only. Otherwise, one of these separating means can be combined with other separating means.

The piston, the valves, and other members of the purifying means can be replaced with other materials, so long as such materials function in the same or similar way.

We claim:
1. A portable water purifier comprising:
   an upright oblong pump chamber containing a hand pump therein;
   an upright oblong water-purifying chamber containing therein a readily exchangeable cartridge which comprises an upper cylinder containing porous hollow fibers therein, and a lower cylinder containing an active carbon therein, both cylinders being combined together to form the cartridge, said water-purifying chamber having an opening at the top thereof;
   a removable cap coupled to said water-purifying chamber for closing said opening in said water-purifying chamber;
   said exchangeable cartridge being removable through said opening at the top of said water-purifying chamber by lifting said cartridge out through said opening, upon removal of said cap;
   said pump chamber and said water-purifying chamber being arranged side-by-side substantially in parallel to each other with a partition separating the two chambers;
   a passage arranged at bottom portions of said pump chamber and water-purifying chamber for providing a water communication path therebetween;
   a water inlet at a lower portion of said water-purifying chamber;
   a water outlet at an upper portion of said water-purifying chamber; and
   said water inlet and said passage being provided with respective check valve means for limiting the flow of water only to a direction from said water inlet into said water-purifying chamber.

2. The portable water purifier of claim 1, wherein said pump chamber and said water-purifying chamber are defined by a single casing which has an oval cross-section and a common partition wall between said chambers.

3. The portable water purifier of claim 2 wherein a single casing also defines said passages and said inlet.

* * * * *